Feb. 14, 1961 J. J. SAYKAY 2,972,015

CODING APPARATUS

Filed May 8, 1957

4 Sheets-Sheet 1

INVENTOR.
JOSEPH J. SAYKAY

BY

Brumbaugh, Free, Graves & Donohue his ATTORNEYS

Feb. 14, 1961 J. J. SAYKAY 2,972,015

CODING APPARATUS

Filed May 8, 1957 4 Sheets-Sheet 2

INVENTOR.
JOSEPH J. SAYKAY

BY

Brumbaugh, Free, Graves & Donohue
his ATTORNEYS.

CODING APPARATUS

Filed May 8, 1957

4 Sheets-Sheet 3

INVENTOR.
JOSEPH J. SAYKAY

BY Brumbaugh, Free, Graves + Donohue his ATTORNEYS.

Feb. 14, 1961 J. J. SAYKAY 2,972,015

CODING APPARATUS

Filed May 8, 1957 4 Sheets-Sheet 4

INVENTOR.
JOSEPH J. SAYKAY

BY Brumbaugh, Free, Graves & Donohue
his ATTORNEYS.

United States Patent Office 2,972,015 Patented Feb. 14, 1961

2,972,015

CODING APPARATUS

Joseph J. Saykay, Sea Cliff, N.Y., assignor to Fairchild Camera and Instrument Corporation, Syosset, N.Y., a corporation of Delaware Filed May 8, 1957, Ser. No. 657,886

23 Claims. (Cl. 178—17)

This invention relates to coding apparatus, and has particular reference to such apparatus adapted to be used with key operated writing mechanisms to store the written information in coded form on a desired storage medium.

Key operated mechanisms, such as typewriters, adding machines and like apparatus, generally provide printed information. In many instances, it is desirable to convert this information into coded symbols on a particular storage medium, for example, punched tape. Substantial savings in time may be effected if such coded information may be transferred to tape simultaneously with printing on paper by the key operated machine. So-called common language machines operating on a five-unit or Baudot code are in wide use and if the printed information is placed on punched tape in accordance with this code, it may be transmitted at a later time over telegraph lines or the like and be read at the receiving end by conventional Teletype printers.

Since common language machines utilize the five-unit code, only 32 different code combinations are available. Accordingly, it is necessary to have two shift conditions ordinarily designated "figures" and "letters" to increase the possible code combinations to 64. For this reason, each key of a telegraph printer keyboard carries two characters, one of which represents the lower case characters or "letters" and the other represents the upper case characters or "figures." In order to receive the lower case characters correctly, they must be preceded by the "letters" code symbol and the upper case characters must be preceded by the "figures" code symbol. While these two code symbols are purely functional in that the "letters" or "figures" symbols or code combinations are not printed, they still must be punched into the tape in order to operate the reading printer correctly.

Increasing use is being made of storage mediums such as perforated tape and magnetic tape in fields other than communications to provide information storage for data processing and computers and like devices, for example. Accordingly, key mechanisms other than telegraph printers such as typewriters, adding machines, computers and the like require modification to store information on punched tape and other mediums. However, when standard office equipment is used to prepare the tape punched with the five-unit code, difficulties arise due to the fact that such machines include keyboards consisting of a row or rows of keys in which characters are carried in the lower and upper case, as in the standard typewriter. Such a typewriter keyboard contains four rows of keys in which the first row represents the digits 2 to 0 in the lower case and punctuation marks in the upper case. Thus, the operator is not required to depress the typewriter shift key when writing the digits 2 to 0. However, if five-unit code tape is being prepared, unless such digits are preceded by the "figures" code symbol, the tape will not be properly perforated and will incorrectly actuate the printing mechanism.

In the above circumstances, it has been necessary in the past to allocate two of the typewriter keys to provide the "figures" and "letters" code symbols on the perforated tape. Obviously, the use of these additional keys will, especially with an inexperienced operator, make for inefficiency in the entire typing operation.

Suggestions have been made that the foregoing problems be overcome by employing a six-unit code which has enough combinations to represent every key in the typewriter by a distinctly different code symbol. While information punched in a six-unit code can be transmitted over telegraph lines with the same facility as a five-unit code, it is, of course, less economical in the use of line time. Thus, for every ten words in the six-unit code transmitted, 11½ words may be transmitted in the five-unit code over the same period of time and at the same cost.

In my copending application Serial No. 504,065, filed April 26, 1955, now Patent No. 2,859,276, apparatus for punching tape with five-unit code symbols for use with key operated mechanisms such as typewriters has been described. A diode matrix used in such apparatus was divided into three sub-assemblies representing "letters," "figures" in the lower case and "figures" in the upper case. The present invention constitutes an improvement on that described and claimed in the aforesaid copending application designed to simplify and improve the reliability of operation of the coding apparatus.

Accordingly, it is an object of the present invention to provide a novel diode matrix having a simplified construction and producing output signal combinations in two different codes.

It is another object of the invention to provide a diode matrix having the above characteristics in which oppositely polarized diodes couple input and output lines.

It is a further object of the invention to provide coding apparatus incorporating the novel diode matrix.

It is yet another object of the invention to provide such coding apparatus in which certain code symbols required for printing are automatically impressed on the information transfer medium.

It is still a further object of the invention to provide coding apparatus of the above character which may be readily used with conventional key operated mechanisms in which dual function keys may each represent two characters, and in which a pair of code symbols indicative of the key's functions are impressed on a storage medium.

It is yet a further object of the invention to provide coding apparatus having the above characteristics in which two cycles of operation are respectively initiated by depressing a key and releasing the key.

These and further objects of the invention are accomplished by the use of a diode matrix responsive to positive and negative potentials to produce first and second signal combinations in different codes. Such a matrix may be termed a bipolar diode matrix, since some of the diodes are polarized to provide coded output signals when positive potentials are applied to the matrix while the remaining diodes are polarized to provide different coded output signals when negative potentials are applied to the matrix. Accordingly, the inventive diode matrix may be used in code converters to replace the two code stacks normally found in such devices. To this end, the diode matrix is constructed to generate signals in one code in response to positive current input and entirely different signals in another code in response to negative current signals.

In one application of the bipolar diode matrix, printed information, such as provided by typewriters, is transferred to another storage medium, such as punched tape, simultaneously with such printing. In one embodiment, a number of selector relays, five in the case of a five-unit code, are selectively energized by signals from the diode matrix associated with the key operated mechanism to determine, through further circuitry, the information transfer devices that must be actuated so that appropriate code symbols will be punched into the tape or other transfer medium. Signals from the diode matrix also control further circuits so that when switching from "letters" to "figures" or "figures" to "letters," signals for an appropriate code symbol are generated and supplied to the information transfer means.

In a preferred embodiment of the invention, depressing a key initiates one cycle of operation in which code symbols, such as "figures" or "letters" information, is punched on the tape, for example. Upon release of the key, a second cycle is initiated in which the character represented by the key is punched in the tape.

Actuation of a key, such as a typewriter shift key, to condition the machine for operation of a dual function key results in a change in the polarity of the potential applied to the diode matrix. Accordingly, the oppositely polarized diodes are effective to supply different coded signals to the selector relays.

These and further objects and advantages of the invention will be more readily understood when the following description is read in connection with the accompanying drawings, in which.

Referring to an illustrative embodiment of the invention in greater detail with particular reference to the drawings, apparatus adapted to be employed with a standard keyboard typewriter is shown. However, it will be understood that the invention is not limited to typewriters but may be utilized with adding machines, computers and like mechanisms. Moreover, the bipolar diode matrix may function in code converters.

Figure 1:
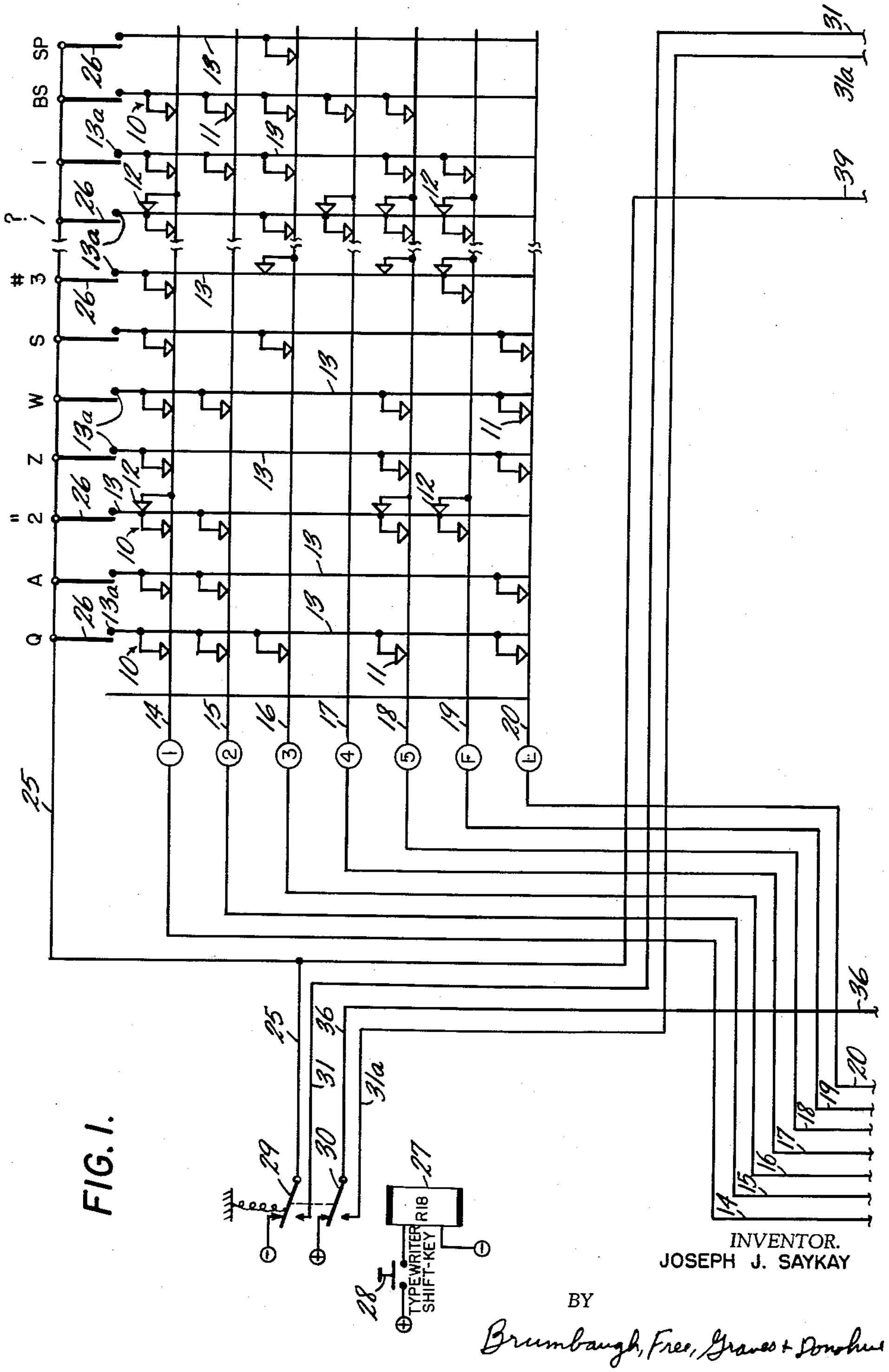
Figure 1 is a schematic circuit diagram of a diode matrix in accordance with the present invention forming a portion of a circuit providing coded signals for punching tape.

The diode matrix shown in Figure 1 comprises a number of code stacks 10 representing one or two characters indicated thereabove. Each of the stacks 10 is formed by a selected number of oppositely polarized unidirectional conducting elements or diodes 11 and 12 joining input conductors 13, fastened to terminals 13*a*, to output conductors 14 to 20, inclusive, fastened to diagrammatically represented output terminals ① to ⑤, Ⓕ and Ⓛ, since the five-unit or Baudot code is being used in the example given. In practice, the stacks 10 and associated conductors are assembled in a suitable container which carries appropriate input terminals, corresponding to the terminals 13*a*, and output connections, corresponding to the terminals ① to ⑤, Ⓕ and Ⓛ.

Figure 2:
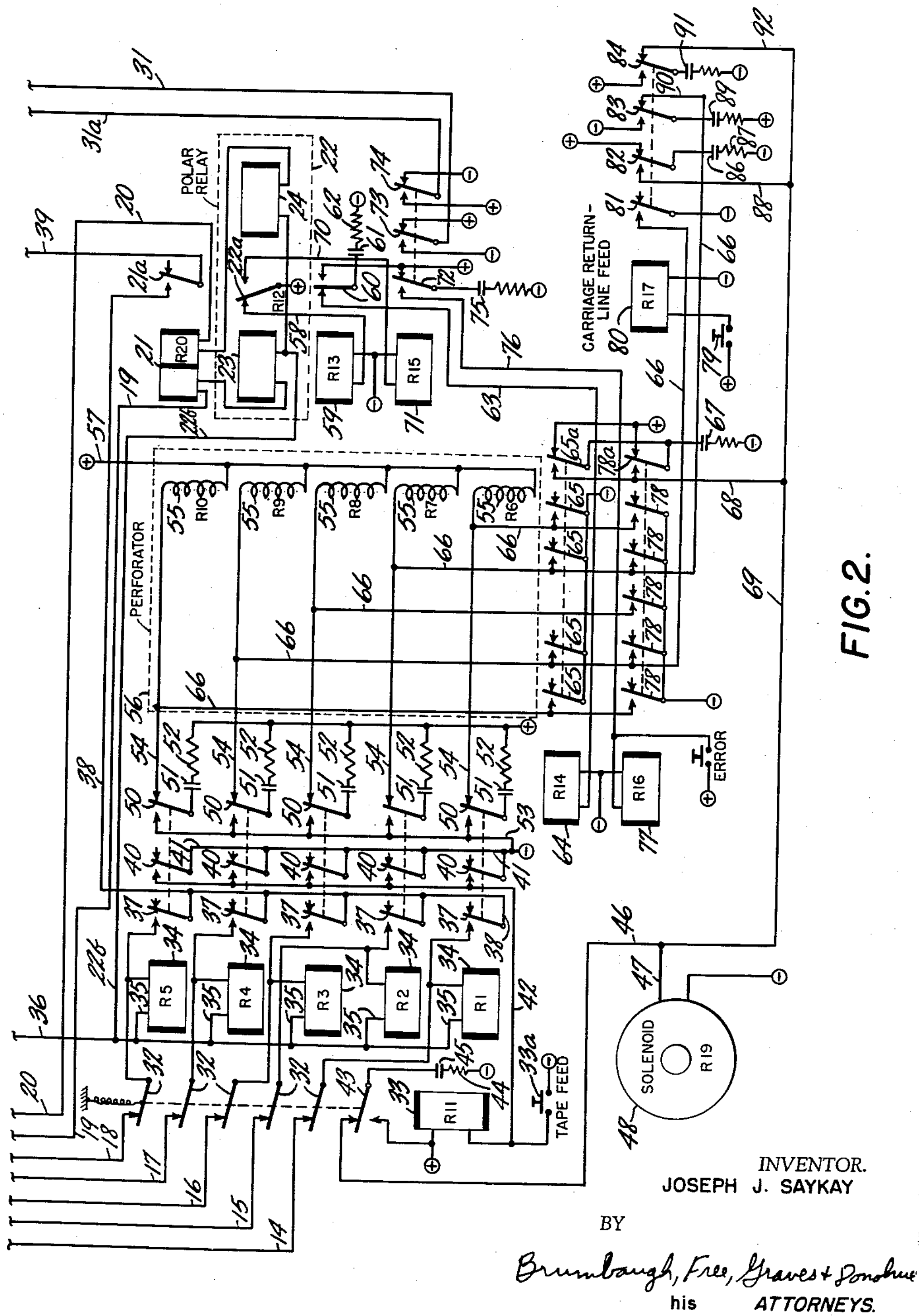
Figure 2 is a further portion of the schematic circuit of Figure 1.

Signals on the lines 19 and 20 lead through windings 21 of a two-winding relay to a polar relay 22 (Figure 2), the return being through a conductor 22*b*. A pair of magnets 23 and 24 in the relay 22 actuate an armature 22*a* between a pair of contacts connected in a manner described hereinafter.

Returning to Figure 1, a conductor 25 is connected to a number of switch arms 26 arranged to be actuated by depressing an associated typewriter key (not shown), carrying the various typewriter characters as indicated, to make contact with the input terminals 13*a* in the stacks 10. To control the output signals from the diode matrix in accordance with the condition of the typewriter, a relay 27 is operated when a typewriter shift key 28 is depressed to change the polarity of the potential on the conductor 25 which, of course, reverses the polarity of the voltage applied to the diode matrix through the switch arms 26.

More specifically, energizing the relay 27 displaces armatures 29 and 30, the former engaging its front contact which leads to a conductor 31 normally carrying a positive potential, and the latter being energized by a negative potential on a conductor 31*a*. It will be apparent, therefore, that the polarities of the armatures 29 and 30 are reversed by depression of the shift key 28, because normally negative and positive potentials are supplied to their back contacts, respectively. The diode matrix thereby is supplied through the switch arms 26 with negative or positive potentials according to the position of the typewriter shift key 28. Thus relay 27 may be termed a two-state means which in its energized state engages its front contacts and in its deenergized state engages its back contacts.

The output signal conductors 14 to 18 normally couple signals from the diode matrix through armatures 32 of a relay 33 (Figure 2) to selector relays 34 to actuate them in accordance with the code combination associated with the particular character on a selected typewriter key. One side of each of the relays 34 is normally supplied with a positive potential through conductors 35 and 36 which lead to the armature 30 of the relay 27 (Figure 1).

Each of the relays 34 is provided with a hold circuit armature 37 coupled through a conductor 38, the armature 21*a* of the relay 21, when actuated, and another conductor 39 to the line 25. Accordingly, upon energization of any one of the relays 34, the armature 37 engages its front contact which leads to one side of the energized relay. The resulting hold circuit for that particular relay remains intact as long as the relay 21 is excited, this interval being determined by the depression time of any one of the typewriter keys.

A second armature 40, maintained at a negative potential by a line 41, is also actuated by each of the relays 35 to energize, through a conductor 42, the relay 33 whose other side is returned to a positive potential. It will be apparent that when the relay 33 picks up, the diode matrix will be disconnected from the selector relays 34 by the armatures 32. As pointed out in the above referred to copending application, such disconnection eliminates the adverse effects of current leakage through the diodes and prevents unwanted operation of any of the relays 34.

A further armature 43, when actuated by the relay 33, completes a charging circuit through a resistor 44 to a capacitor 45, the resistor 44 being joined to a negative potential and the relay forward contact being energized by a positive potential. Accordingly, upon deenergization of the relay 33 the armature 43 engages its back contact and the capacitor 45 discharges through conductors 46 and 47 to operate a punch solenoid 48 of conventional design returned to a negative potential.

Each relay 34 controls a third armature 50 connected through a capacitor 51 and a resistor 52 to a source of positive potential. When actuated against its forward contact, the capacitor 51 is charged from a negative potential through a conductor 53. Accordingly, the capacitor 51 discharges, when the relay 34 releases, through a conductor 54 to a magnet coil 55 in a perforator 56, one coil 55 being provided for each of the selector relays 34. The other side of the coils 55 is returned to a positive potential through a conductor 57.

The perforating mechanism including the magnet coils 55 and punch 48 have not been described in detail since any conventional apparatus well known in the art may be employed to perform their functions. It suffices to say that when the punch 48 operates, it perforates the tape and steps it forward, the perforations being in accordance with the perforator magnet coils 55 that are or have been energized. Moreover, operation of the punch solenoid 48 resets the perforator 56.

Since the five-unit or Baudot code affords only 32 different signal combinations, it is necessary to use the same code combinations twice and to identify them as "figures" or "letters" combinations by an appropriate code symbol on the punched tape, or other storage medium such as mangetic tape, preceding the "figures" or "letters" information. In the past, a pair of additional keys on the typewriter were required so that the operator could place the "figures" or "letters" code information on the tape and this, of course, considerably slowed the typing operation. In the present instance the polar relay 22, which actuates the armature **22*a*** between a pair of contacts, provides, together with additional apparatus described hereinafter, automatic punching of the "figures" and "letters" code on the perforated tape.

More particularly, the "figures" conductor 19 when energized excites the magnet 23 to displace the armature **22*a* against a contact joined to a conductor 58 leading to a relay 59 which is returned to a negative potential. When energized, the relay 59 actuates an armature 60 against its front contact. A previously charged capacitor 61 discharges through a resistor 62, a conductor 63 and a further relay 64, returned to a negative potential, to operate the relay 64 for a short interval. Such momentary operation displaces four negatively biased armatures 65 against front contacts leading through conductors 66 to four of the perforator coils 55. A further armature 65*a*, discharges a charged capacitor 67, when actuated, through conductors 68, 69 and 47 to operate the punch solenoid 48**. Accordingly, the "figures" code symbol is punched into the tape.

When the "letters" conductor 20 is energized, the magnet 24 actuates the polar relay armature **22*a* against its other contact to energize a conductor 70 and operate a relay 71 which picks up three armatures 72, 73 and 74. A charged capacitor 75 connected to the armature 72 is, accordingly, discharged through a conductor 76 and a relay 77 to operate five negatively biased armatures 78 momentarily. This energizes the conductors 66 leading to all five of the perforator magnet coils 55, thereby conditioning the punching mechanism to punch the "letters" code symbol on the tape. A further armature 78*a* joined to the charged capacitor 67 energizes, when actuated, the punch solenoid 48 through the conductors 68, 69 and 47** to punch the "letters" symbol into the tape.

Returning to the relay 71, the armatures 73 and 74 when operated reverse the polarity of the conductors 31 and **31*a* leading to the front contacts of the relay 27** (Figure 1) for a purpose that will become apparent from a discussion of the operation of the present system.

A tape feed key switch **33*a* also may be depressed to energize the relay 33 thereby charging the capacitor 45. Release of the armature 43 energizes the punch solenoid 48 to step the tape without perforating since none of the coils 55 have been energized. If it is desirable to provide for rapid automatic tape feed, a vibrating relay may be incorporated to energize and deenergize the relay 33 repeatedly while the switch 33*a*** is depressed.

A carriage return-line feed key switch 79 when depressed closes a circuit to a relay 80 which picks up armatures 81 to 84. The negatively biased armature 81 energizes one of the perforating coils 55 through one of the conductors 66. At the same time, actuation of the armature 82 discharges a capacitor 86, previously charged through a resistor 87, through conductors 88, 69 and 47 to operate the solenoid 48 and punch the carriage return code symbol on the tape. Upon release of the key 79, the armature 83, which in its actuated position provides a charging circuit for a capacitor 89, engages its back contact and energizes one of the perforating magnet coils 55 through conductors 90 and 66. Simultaneously, the armature 84, which functions to charge the capacitor 91 when actuated, returns to its back contact and through conductors 92, 69 and 47 energizes momentarily the solenoid 48 to punch the line feed code symbol.

Several typical operating cycles of the above described illustrative embodiment of the inventon will now be described with particular reference to the perforated tape of Figure 3 and the timing chart of Figures 4A and 4B. In the interests of clarity, each of the relays is identified by a letter and number such as R1, R2, R3, etc., as well as by a reference numeral.

Assuming first the depression of the typewriter key "Q," the switch arm 26 engages the input terminal **13*a* of the stack 10 resulting in signals from the diode matrix to energize the relays 34 (R1, R2, R3 and R5), such signals being supplied by the diodes 11 and the signal output conductors 14, 15, 16 and 18, respectively. The line 20 is coupled by another one of the diodes 11 to the relay 21 (R20) which, accordingly, picks up its armature 21*a* to close a holding circuit for the selected relays 34. In addition, the conductor 20 energizes the magnet 24 in the polar relay 22 (R12) to shift its armature 22*a* to the "letters" position, in the event a "figures" key had been operated previously. Accordingly, the relay 71 (R15) picks up its armature 72 which momentarily energizes the relay 77 (R16) so that the armatures 78 are operated to energize the relay coils 55 (R6 to R10) in the perforator 56. At the same time, the armature 78*a* initiates operation of the punch solenoid 48** (R19) to punch the "letters" code symbol on the tape, as shown in Figure 3.

Figure 4A:
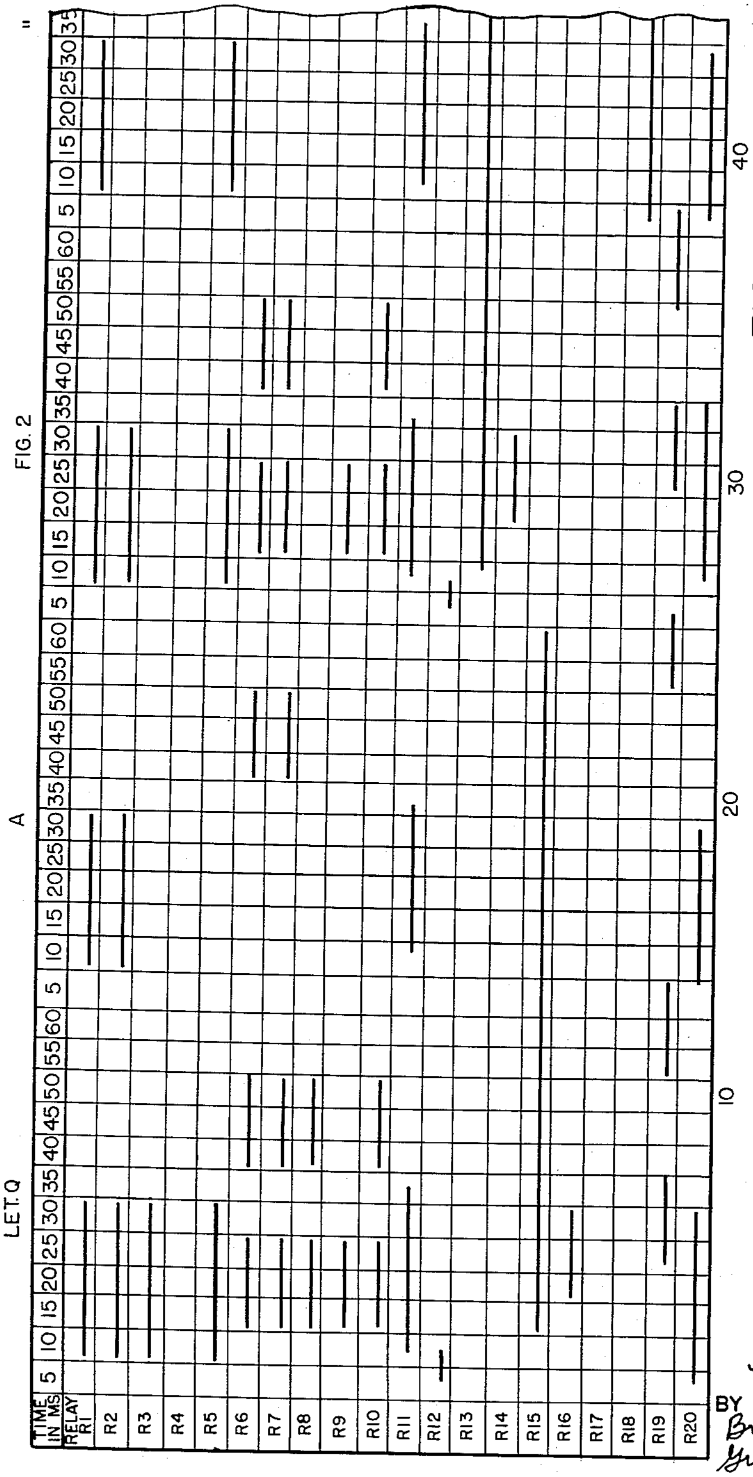
Figures 4A and 4B together comprise a timing chart helpful in understanding the operation of the circuits of Figures 1 and 2 in perforating the tape of Figure 3.

The timing chart of Figure 4A illustrates clearly the foregoing sequence, the fast-acting relay R12 closing its contact shortly before the relays R1, R2, R3 and R5 pick up their armatures. As soon as one of the armatures 40 engages its front contact, the relay 33 (R11) is energized to disconnect the selector relays 34 from the diode matrix and initiate charging of the capacitor 45. Moreover, the holding relay 21 holds the relays 34 for as long as the key "Q" is depressed.

Upon release of the typewriter key "Q," the relay 21 drops out to open the holding circuits for the relays 34. As a result, these relays are deenergized and their armatures 50 engage back contacts and energize the perforator selector magnets 55 (R6, R7, R8 and R10). In addition, the armatures 40 open the energizing circuit for the relay 33 to permit the armature 43 to swing against its back contact. This discharges the capacitor 45 through the solenoid 48 to punch the "Q" code combination on the tape, as will be evident from the tape of Figure 3 and the timing chart of Figures 4A and 4B.

It will be apparent from the above that depressing the key "Q" results in one series of operations and releasing the key another. In other words, two separate operating cycles of the relays in the inventive apparatus occur during depression and release of a typewriter key, and this contributes much to the efficiency and reliability of the system.

If the letter "A" must next be printed by the typewriter and punched on the tape, depression of the appropriate key results in the closure of the switch arm 26 and the energization of the relays 34 (R1 and R2). In this instance, however, the polar relay armature 22 remains in its "letters" position with the result that the letters code signal is not punched on the tape. Upon release of the typewriter key "A," the relay 21 (R20) drops out resulting in the punching of the appropriate code signal by the solenoid 48 (R19).

While operating the typewriter, it will be necessary to depress the shift key 28 to print capital letters. Assuming that this operation occurs when the letter "A" is to be printed, the relay 71 (R15) remains energized so that the armatures 73 and 74 are supplying negative and positive potentials, respectively, through the conductors 31 and **31*a* to the front contacts engaged by the armatures 29 and 30 of the relay 27 (R18). Accordingly, energization of the relay 27** fails to shift the polarity on the lines 25 or 36 while capital letters are being printed.

If it is now necessary to print the figure "2," actuation of the appropriate switch arm 26 results in the excitation of the relays 34 (R1, R2 and R3). In addition, a signal is coupled along the "figures" line 19 to energize the relay 21 (R20) and the magnet 23 of the polar relay 22 (R12). The polar relay armature 22*a* snaps against its "figures" contact to pick up the relay 59 (R13) and actuate the armature 60 against its forward contact, thereby discharging the capacitor 61 through the relay 64 (R14). Accordingly, the armatures 65 engage their front contacts to energize the perforator relay magnets 55 (R6, R7, R9 and R10). At the same time, the armature 65*a* engages its front contact and the capacitor 67 discharges through the punch solenoid 48 (R19) to punch the "figures" code on to the tape. Upon release of the typewriter key "2," the relay 21 drops out and the figure "2" is punched on to the tape in the manner described above in connection with the letter "Q."

Assuming that it is necessary to print a quotation mark, the typewriter shift key 28 is depressed and the resulting energization of the relay 27 (R18) actuates the armatures 29 and 30 against their forward contacts which lead through the conductors 31 and 31*a*, respectively, and the armatures 73 and 74 to positive and negative potentials. Accordingly, the potentials on the lines 25 and 36 are reversed and a positive potential is applied through the corresponding switch arm 26 to the diode matrix.

It will be apparent that the selector relays 34 (R1 and R5), which are now returned to the negative line 36, will be energized through the diodes 12 which are polarized oppositely to the diodes 11. The "figures" line 19 will also be energized through one of the diodes 12 to pick up the relay 21 (R20), which is also returned through the relay 23 and the line 22*b* to the negative line 36. Since the polar relay armature 22*a* remains in the "figures" position, the "figures" code will not be punched on the tape. The quotation mark code signal will, however, be punched in the usual manner upon release of the switch arm 26 and the relay 21.

Figure 3:
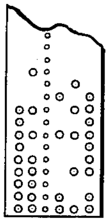
Figure 3 illustrates a piece of tape perforated by the apparatus of Figures 1 and 2.
Figure 4B:
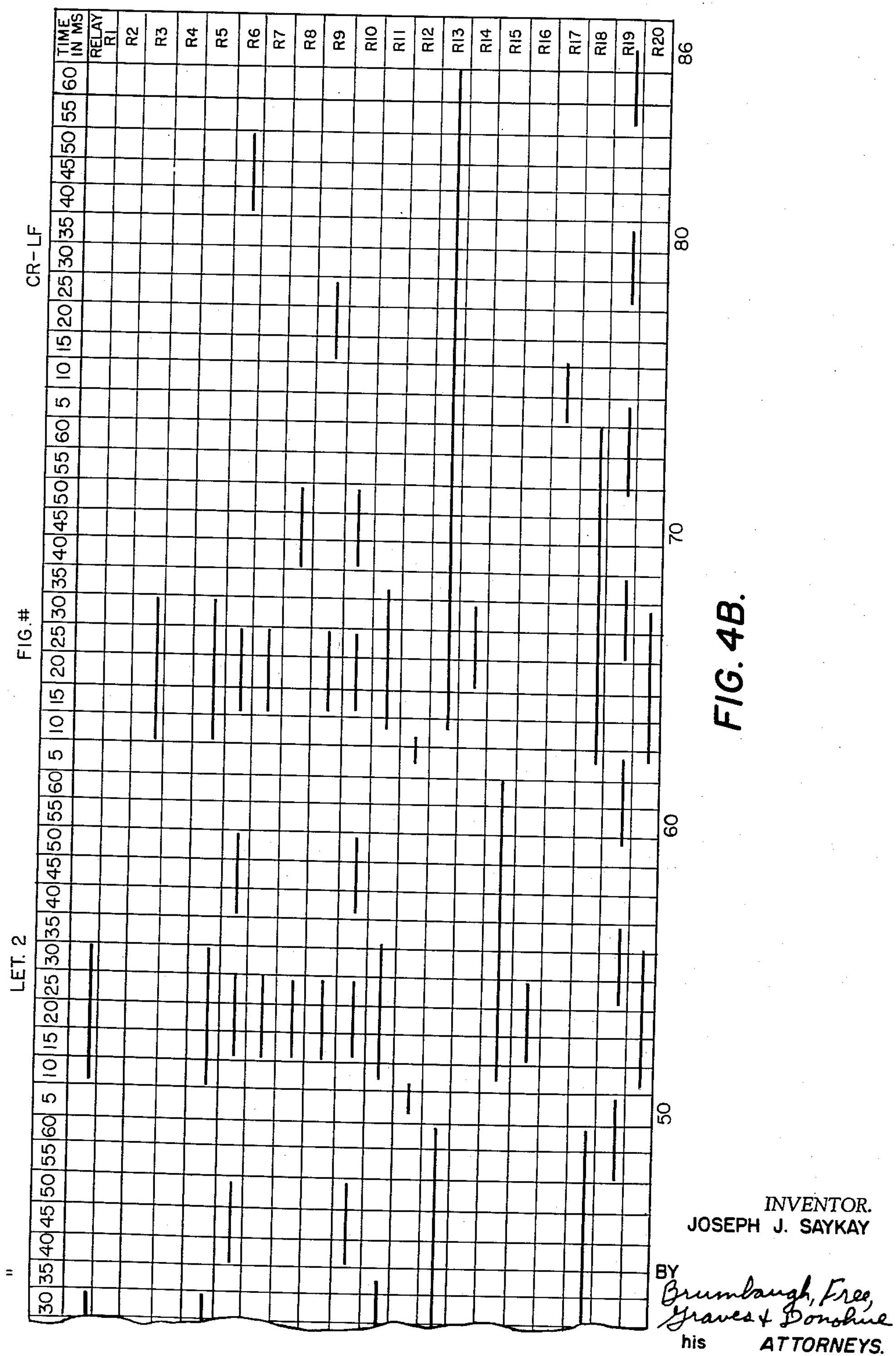

The remaining operations to punch the tape illustrated in Figure 3 will be apparent from the time chart of Figures 4A and 4B. However, it might be well to examine the carriage return-line feed operation which is initiated by depressing the switch key 79. The relay 80 (R17) picks up the armature 81, which energizes the perforator magnet relay 55 (R9) and the armature 82 which operates the punch solenoid 48 (R19). Accordingly, the carriage return symbol is punched into the tape. The armatures 83 and 84 are also picked up at this time to charge the capacitors 86 and 89. Upon release of the key 79, the armatures 83 and 84 are returned to their back contacts to energize the perforator magnet 55 (R7) and the solenoid 48 to punch the appropriate line feed code symbol on to the tape.

From the above, it will be apparent that the present apparatus may be employed to convert standard key operated mechanisms such as typewriters to machines capable of perforating tape with a five-unit code. For example, by virtue of the automatic punching of the "letters" and "figures" code symbols, two additional keys necessary in prior devices of this type to perform these functions may be eliminated to increase the efficiency of the typing operations.

It is often necessary to convert information to signals in one of two sets of codes. The inventive bipolar diode matrix greatly simplifies such conversion by eliminating the second stack normally used. Thus, positive potentials may be applied to the input terminals 13*a* in the event one code combination is required and negative potentials when the other code signals must be generated.

While the present invention has been described in connection with code conversion and key operated mechanisms such as typewriters to provide perforated tape, it will be understood that the bipolar matrix may be used wherever two different codes are necessary. Moreover, any key operated mechanisms such as adding machines may be uesd with the matrix and other information transfer mediums such as magnetic tape may be desirable. Therefore, it will be apparent that the above-described embodiments of the invention are illustrative only and modifications thereof will occur to those skilled in the art. Consequently, the invention is not to be limited to the specific apparatus disclosed herein.

I claim:

1. A diode matrix comprising a plurality of input conductors, a plurality of output conductors, diodes connecting selected ones of the input conductors to selected ones of the output conductors, predetermined ones of the diodes being polarized to couple negative potentials from the input to the output conductors in a predetermined pattern to develop a group of first code signals upon negative energization of said input conductors, the remaining diodes being polarized to couple positive potentials from the input to the output conductors in a different pattern to develop a group of second code signals upon positive energization of said input conductors, and at least one of the input conductors being coupled to one of the output conductors by both one of the negative potential coupling diodes and one of the positive potential coupling diodes.

2. A diode matrix comprising input terminals, output terminals, first diode means polarized in one direction connecting selected input terminals to selected output terminals in a predetermined pattern to develop a group of first code signals upon negative energization of said input terminals, second diode means polarized oppositely to the first diode means connecting selected input terminals to selected output terminals in a different pattern to develop a group of second code signals upon positive energization of said input terminals, and at least one of the input terminals being coupled to one of the output terminals by both one of the first diode means and one of the second diode means.

3. A diode matrix comprising input terminals, output terminals, diode means connecting selected ones of the input terminals to selected ones of the output terminals, predetermined ones of the diode means being polarized to couple negative signals from the input terminals to the output terminals in a predetermined pattern to develop a group of first code signals upon negative energization of said input terminals, the remaining diode means being polarized to couple positive signals from the input terminals to the output terminals in a different pattern to develop a group of second code signals upon positive energization of said input terminals, and at least one of the input terminals being coupled to one of the output terminals by both one of the negative potential coupling diodes and one of the positive coupling diodes.

4. In coding apparatus, a diode matrix generating first and second coded signals when energized by positive and negative potentials, respectively. a plurality of switch means to energize said matrix, conditioning means operable to provide positive and negative potentials, said switch means being coupled to said conditioning means, actuation of one of the switch means thereby energizing the diode matrix with a potential having a polarity determined by the conditioning means.

5. In coding apparatus, a diode matrix including a plurality of input conductors, a plurality of output conductors and diodes connecting selected ones of the input conductors to selected ones of the output conductors, the diodes being polarized to produce first and second coded signals on the output conductors in response to positive and negative potentials on the input conductors, switch means to energize each of the input conductors, conditioning means operable to provide positive and negative potentials, said switch means being coupled to said conditioning means, actuation of one of the switch means thereby energizing its associated input conductor with a potential having a polarity determined by the conditioning means.

6. In coding apparatus for use with key operated mechanisms containing dual purpose keys, a diode matrix responsive to positive and negative potentials to generate first and second coded signals, respectively, conditioning means operable to provide positive and negative potentials, and switch means coupled to said conditioning means and responsive to depression of one of the dual purpose keys to energize the diode matrix with a potential having a polarity determined by the conditioning means.

7. In coding apparatus for use with key operated mechanisms containing dual purpose keys, a diode matrix including a plurality of input conductors, a plurality of output conductors and diodes connecting selected ones of the input conductors to selected ones of the output conductors, the diodes being polarized to produce first and second coded signals on the output conductors in response to positive and negative potentials on the input conductors, conditioning means operable to provide positive and negative potentials, and switch means coupled to the conditioning means and responsive to depression of one of the dual purpose keys to energize an associated input conductor of the diode matrix with a potential having a polarity determined by the conditioning means.

8. In coding apparatus, a diode matrix generating coded signals when energized, a plurality of switch means actuated to energize said matrix, first means responsive to coded signals generated in response to actuation of one of the switch means to provide signals representative of code symbols identifying the general nature of the character represented by the one switch means, and second means responsive to termination of said last-mentioned coded signals by deactuation of the one switch means to generate signals representative of code symbols identifying the specific nature of the character represented by the one switch means.

9. In coding apparatus as defined in claim 8, wherein the plurality of switch means represent characters divided into two groups and the first means includes a two state device actuated to one state when the switch means representing one group of characters are actuated and to another state when the switch means representing the other group of characters are actuated.

10. In coding apparatus, a diode matrix generating coded signals when energized, a plurality of switch means to energize said matrix, a plurality of operating elements selectively energized by coded signals generated in response to actuation of one of the switch means, two state means responsive to said last-mentioned coded signals when in one state to generate signals representative of code symbols identifying the general nature of the one switch means, the operating elements being deenergized upon termination of said coded signals by deactuation of the one switch, and means responsive to deenergization of the operating elements to generate signals representative of code symbols identifying the specific nature of the one switch means.

11. In coding apparatus as defined in claim 10, wherein the switch means are divided into two groups, and the two state means comprises a polar relay actuated to one state when the switches in one group are actuated and to another state when the switches in the other group are actuated.

12. In coding apparatus for use with key operated mechanisms, a diode matrix generating coded signals when energized, a plurality of keys each representing a character, means responsive to depression of one of the keys to energize the matrix and generate coded signals representing said one key, first means responsive to said last-mentioned coded signals to generate signals representative of code symbols identifying the general nature of the character represented by the one key, and second means responsive to termination of said coded signals by release of the one key to generate signals representative of code symbols identifying the specific nature of the character represented by the one key.

13. In coding apparatus as defined in claim 12, wherein the keys represent characters divided into two groups, and the first means includes a polar relay actuated to one state when the keys representing one group of characters are depressed and to another state when the keys representing the other group of characters are depressed.

14. In coding apparatus for use with key operated mechanisms, a diode matrix generating coded signals when energized, a plurality of keys each representing a character, means responsive to depression of one of the keys to energize the matrix and generate coded signals representing said one key, a plurality of operating elements selectively energized by said last-mentioned coded signals, two state means responsive to said coded signals when in one state to generate signals representative of code symbols identifying the general nature of the character of the one key, the operating elements being deenergized upon termination of said coded signals by release of the one key, deenergization of the operating elements generating signals representative of code symbols identifying a specific nature of the character of the one key.

15. In coding apparatus as defined in claim 14, wherein the keys represent characters divided into two groups, and the two state means includes a polar relay actuated to one state when the keys representing one group of characters are depressed and to another state when the keys representing the other group of characters are depressed.

16. In coding apparatus for use with key operated mechanisms, a diode matrix generating coded signals when energized, a plurality of keys each representing a character, means responsive to depression of one of the keys to energize the matrix and generate coded signals representing said one key, a plurality of relays selectively energized by said last-mentioned coded signals, two state means responsive to said coded signals when in one state to generate signals representative of code symbols identifying the general nature of the character of the one key, the selected relays being deenergized upon termination of the coded signals by release of the one key, and means responsive to deenergization of the selected relays to generate signals representative of code symbols identifying the specific nature of the character of the one key.

17. In coding apparatus as defined in claim 16, wherein the keys represent characters divided into two groups, and the two state means includes a polar relay actuated to one state when the keys representing one group of characters are depressed and to another state when the keys representing the other group of characters are depressed.

18. In coding apparatus for use with key operated mechanisms containing keys including dual purpose keys representing two characters, a diode matrix generating first and second signals when energized by positive and negative potentials, respectively, conditioning means operable to provide positive and negative potentials, switch means coupled to said conditioning means and responsive to depression of one of the dual purpose keys to energize the diode matrix with a potential having a polarity determined by the conditioning means to generate coded signals representing one of the two characters of the one dual purpose key, first means responsive to said last-mentioned coded signals to generate signals representative of code symbols identifying the general nature of the one character, and second means responsive to termination of said last-mentioned coded signals by release of the one key to generate signals representative of code symbols identifying the specific nature of the one character.

19. In coding apparatus as defined in claim 18, wherein the keys represent characters divided into two groups, and the first means includes a polar relay actuated to one state when keys representing one group of characters are depressed and to another state when the keys representing the other group of characters are depressed.

20. In coding apparatus for use with key operated mechanisms containing keys including dual purpose keys representing two characters, a diode matrix including a plurality of input conductors, a plurality of output conductors and diodes connecting selected ones of the input conductors to selected ones of the output conductors, the diodes being polarized to produce first and second coded signals on the output conductors in response to positive and negative potentials on the input conductors, respectively, conditioning means operable to provide positive and negative potentials, switch means coupled to the conditioning means and responsive to depression of one of the dual purpose keys to energize an associated input conductor of the diode matrix with a potential having a polarity determined by the conditioning means to generate coded signals representing one of the two characters of the one dual purpose key, first means responsive to said last-mentioned coded signals to generate signals representative of code symbols identifying the general nature of the one character, and second means responsive to termination of said last-mentioned coded signals by release of the one key to generate signals representative of code symbols identifying the specific nature of the one character.

21. In coding apparatus as defined in claim 20, wherein the keys represent characters divided into two groups, and the first means includes a polar relay actuated to one state when the keys representing one group of characters are depressed and to another state when the keys representing the other group of characters are depressed.

22. In coding apparatus for use with key operated mechanisms containing keys including dual purpose keys representing two characters, a diode matrix generating first and second coded signals when energized by positive and negative potentials, respectively, conditioning means operable to provide positive and negative potentials, switch means coupled to said conditioning means and responsive to depression of one of the dual purpose keys to energize the diode matrix with a potential having a polarity determined by the conditioning means to generate coded signals representing one of the two characters of the one dual purpose key, a plurality of relays selectively energized by said last-mentioned coded signals, two state means responsive to said last-mentioned coded signals when in one state to generate signals representative of code symbols identifying the general nature of the one character, the selected relays being deenergized upon termination of said coded signals by release of the one key, means responsive to deenergization of the selected relays to generate signals representative of code symbols identifying the specific nature of the one character.

23. In coding apparatus as defined in claim 22, wherein the keys represent characters divided into two groups, and the two state means comprises a polar relay actuated to one state when the keys representing one group of characters are depressed and to another state when the keys representing the other group of characters are depressed.

References Cited in the file of this patent

UNITED STATES PATENTS

| | | |
|---|---|---|
| 2,244,700 | Horton | June 10, 1941 |
| 2,655,625 | Burton | Oct. 13, 1953 |
| 2,665,336 | Saykay | Jan. 5, 1954 |
| 2,673,936 | Harris | Mar. 30, 1954 |
| 2,747,045 | Parmer | May 22, 1956 |
| 2,823,368 | Avery | Feb. 11, 1958 |